United States Patent

[19]

Shin

[11] Patent Number: 5,990,636

[45] Date of Patent: Nov. 23, 1999

[54] LINEARITY COIL OF HORIZONTAL DEFLECTING CIRCUIT

[75] Inventor: Ki-Ho Shin, Suwon, Rep. of Korea

[73] Assignee: Samsung Electronics Co., Ltd, Suwon, Rep. of Korea

[21] Appl. No.: 08/867,974

[22] Filed: Jun. 3, 1997

[30] Foreign Application Priority Data

Dec. 24, 1996 [KR] Rep. of Korea ...................... 96-71768

[51] Int. Cl.⁶ .................................................. H01J 29/70
[52] U.S. Cl. ..................................... 315/368.25; 315/400
[58] Field of Search ......................... 315/368.25, 368.26, 315/400, 370, 371, 411

[56] References Cited

U.S. PATENT DOCUMENTS

| | | | |
|---|---|---|---|
| 4,331,907 | 5/1982 | Laux et al. ............................. | 315/400 |
| 4,677,350 | 6/1987 | Wharton et al. ......................... | 315/371 |
| 4,686,430 | 8/1987 | Jennings, Jr. ............................ | 315/371 |
| 4,833,432 | 5/1989 | Ohtsu et al. ............................. | 335/212 |
| 5,473,299 | 12/1995 | Tsutsumi et al. ....................... | 336/110 |
| 5,777,697 | 7/1998 | Baek ...................................... | 348/806 |

FOREIGN PATENT DOCUMENTS

| | | | |
|---|---|---|---|
| 0 658 902 | 6/1995 | European Pat. Off. .......... | G11C 7/00 |
| 1424037 | 2/1976 | United Kingdom ............ | H01F 27/00 |
| 2074388 | 10/1981 | United Kingdom ............ | H01F 17/04 |
| 2091058 | 7/1982 | United Kingdom ............ | H03K 4/62 |
| 2157087 | 10/1985 | United Kingdom ............ | H01F 17/04 |

*Primary Examiner*—Edward P. Westin
*Assistant Examiner*—Nikita Wells
*Attorney, Agent, or Firm*—Staas & Halsey

[57] ABSTRACT

A linearity coil of a horizontal deflecting circuit includes a core; a winding connected in series to a horizontal deflecting coil and wound on the core; and a pair of permanent magnets respectively fixed to both ends of the core in the direction of increasing a magnetic force line induced to the core.

6 Claims, 2 Drawing Sheets

FIG. 3
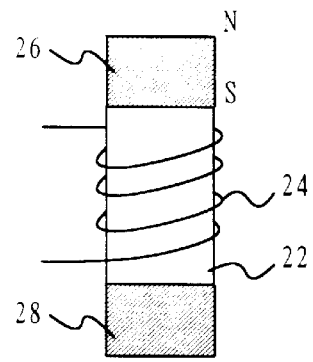
FIG. 4A
FIG. 4B
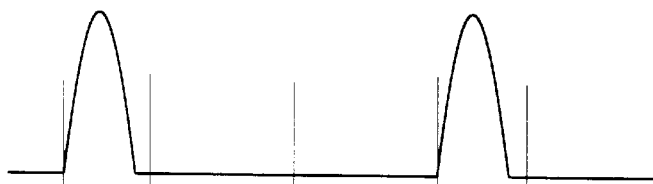
FIG. 4C
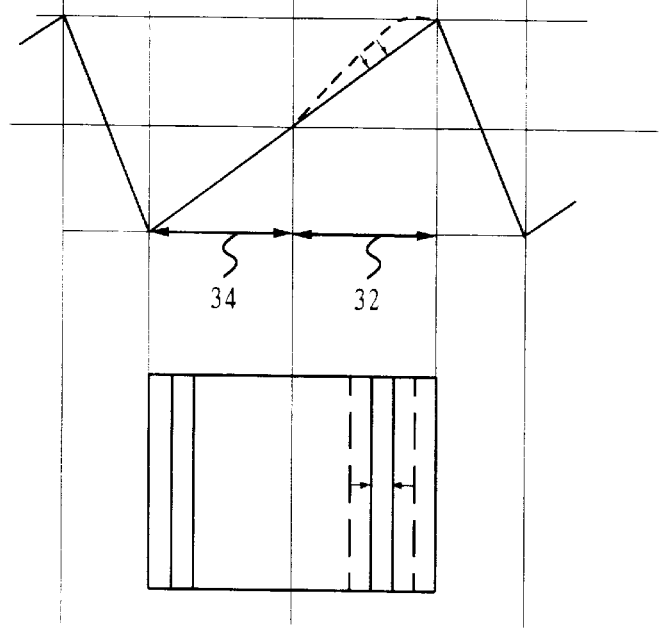

LINEARITY COIL OF HORIZONTAL DEFLECTING CIRCUIT

BACKGROUND OF THE INVENTION

1. Field of the Invention

The present invention relates to a linearity coil of a horizontal deflecting circuit, and more particularly, to a linearity coil which can increase its core saturation quantity.

2. Description of the Related Art

The present inventor has participated in the development of a semiwide screen television. Since the screen of a semiwide screen television is longer in the horizontal dimension than the screen of a general standard television by about one inch, an improvement in a horizontal deflecting circuit has been demanded. If a linearity coil connected in series to a horizontal deflecting coil is small in its core saturation quantity, a right edge portion of the screen becomes "loose" ("loose" meaning that the horizontal dimension is increased as shown in FIG. 4C, or in other words, the horizontal scanning velocity of an electronic beam is decreased) compared with a left edge portion thereof because of weak linearity, and the screen is therefore distorted. To solve such a problem, in a conventional standard television, a permanent magnet 14 is fixed to one end of a core 12 of a linearity coil 10, as shown in FIG. 1. In spite of a solution for this problem, in the semiwide screen television, the right edge portion of the screen still has a distortion problem according to an increase in the horizontal dimension of the screen.

SUMMARY OF THE INVENTION

It is an object of the present invention to provide a linearity coil of a horizontal deflecting circuit which can sufficiently increase its core saturation quantity.

A linearity coil of a horizontal deflecting circuit embodying the present invention includes a core; a coil connected in series to a horizontal deflecting coil and wound on the core; and a pair of permanent magnets respectively fixed to both ends of the core in the direction of increasing a magnetic flux induced in the core.

BRIEF DESCRIPTION OF THE DRAWINGS

The objects, and other features and advantages of the present invention will become more apparent by describing the preferred embodiment thereof with reference to the accompanying drawings, in which:

FIG. 3 is a diagram showing a linearity coil according to the present invention;

FIGS. 4A and 4B are waveform charts showing an operation of the linearity coil of FIG. 3, and FIG. 4C is a plan view of a screen of a semiwide television according to the present invention.

DETAILED DESCRIPTION OF PREFERRED EMBODIMENT

Figure 2:
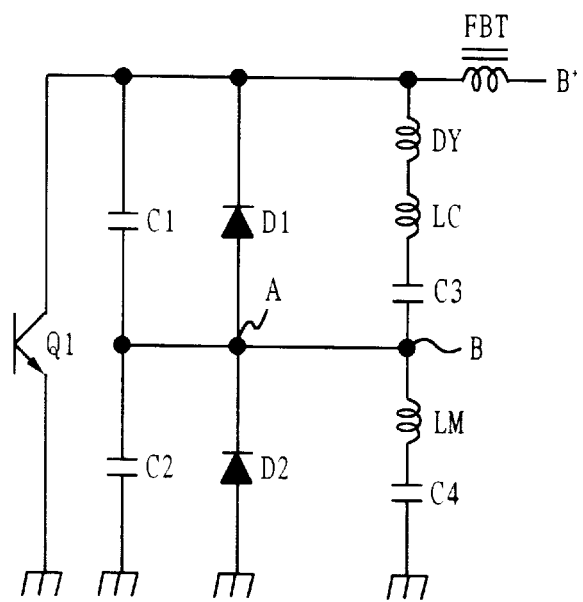
FIG. 2 is a circuit diagram of a horizontal deflecting circuit having a linearity coil according to the present invention.

FIG. 2 shows a horizontal deflecting circuit of a semiwide television according to the present invention. The semiwide television has a screen aspect ratio of 12.8:9 which increases the horizontal size of a conventional television having a screen aspect ratio of 4:3 by about one inch. In such a semiwide television, the horizontal deflecting circuit of a diode modulation system shown in FIG. 2 is used in order to increase the deflection force.

Referring to FIG. 2, capacitors C1 and C2 are serially connected between the collector and emitter of a horizontal output transistor Q1. A diode D1 is connected between both terminals of the capacitor C1, and a diode D2 is connected between both terminals of the capacitor C2. A horizontal deflecting coil DY, a linearity coil LC and a capacitor C3 are connected in series between both terminals of the diode D1. A modulation coil LM and a capacitor C4 are connected in series between both terminals of the diode D2.

The linearity coil LC includes, as shown in FIG. 3, a core 22, a coil 24 wound on the core 22, and a pair of permanent magnets 26 and 28 respectively fixed to both ends of the core 22. Since magnetic force lines of the permanent magnets are united in the direction of increasing the magnetic force lines induced in the core, the core saturation quantity of the linearity coil LC can be sufficiently increased. Therefore, the linearity of the right edge portion of the screen is improved by increasing the deflection force during the latter half of a scanning interval.

If a driving voltage B+ is supplied from a flyback transformer FBT, the voltage is divided and stored in the capacitors C3 and C4. During the latter half 32 (see FIGS. 4A–4C disscused below) of the scanning interval, a horizontal scanning current flows into the horizontal deflecting coil DY through the transistor Q1 by the voltage stored in the capacitor C3, and during the first half 34 of the scanning interval, a current flows into the diode D1, the deflecting coil DY, the linearity coil LC and the capacitor C3. Similarly, during the latter half 32 of the scanning interval, a current flows into the modulation coil LM from the capacitor C4 by a voltage across both terminals of the capacitor C4, and during the first half 34 of the scanning interval, a current flows into the diode D2, the modulation coil LM and the capacitor C4. Therefore, if the voltage across both terminals of the capacitor C4 is controlled in response to a correction signal, a correction current flows into C2, D2, A, B, C3, LC, DY and C1 by a current difference between terminals A and B. A horizontal deflecting current is controlled by this correction current. FIG. 4A shows a waveform of a collector output of the horizontal output transistor Q1, and FIG. 4B shows a waveform of coil current of the horizontal deflecting coil. That is, if the core saturation quantity of the linearity coil is small during the latter half 32 of the scanning interval as shown in FIG. 4B, the deflection force becomes weak as indicated by a dotted line and a slope is increased. Then intervals are widened like vertical dotted lines of the screen as shown in FIG. 4C. If the permanent magnets are fixed to both ends of the core, the core saturation quantity of the linearity coil is increased, and the linearity of a scanning line is improved. Then intervals are uniformly maintained as indicated by solid lines of the screen as shown in FIG. 4C.

Inductance values of the linearity coils of FIGS. 1 and 3 as a function of a coil current are listed below in Table 1.

TABLE 1

Figure 1:
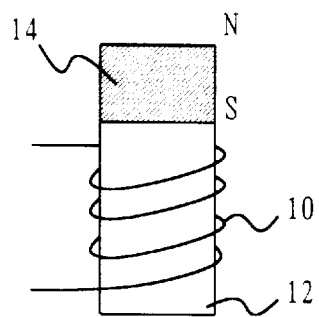
FIG. 1 is a diagram showing a linearity coil of a horizontal deflecting circuit according to the prior art.

| coil current | −3A | 0A | 3A |
|---|---|---|---|
| inductance of linearity coil of FIG. 1 | 13.5 µH | 44 µH | 97.3 µH |
| inductance of linearity coil of FIG. 3 | 24.4 µH | 33 µH | 202 µH |

As shown in Table 1, as the coil current is increased in a positive direction, the inductance value of the linearity coil according to the present invention is increased to about twice the inductance value of the conventional linearity coil. Therefore, the linearity of the horizontal deflection is improved by increasing the deflection force during the latter half of the scanning interval.

As described above, since the permanent magnets are fixed to both ends of the core in order to increase the core saturation quantity of the linearity coil, the linearity is improved during the latter half of the scanning interval, and the screen of the semiwide television can be prevented from being distorted.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A linearity coil of a horizontal deflecting circuit having a horizontal deflecting coil, comprising:
   a core;
   a coil connected in series to the horizontal deflecting coil and wound on said core; and
   a pair of permanent magnets respectively fixed to both ends of said core with like poles pointing toward the core so as to increase a magnetic flux induced in said core, said permanent magnets and said core forming a single bar-shaped body.

2. A horizontal deflecting circuit of a display device, comprising:
   a horizontal deflecting coil; and
   a linearity coil including
      a core, p2 a coil connected in series with said horizontal deflecting coil and wound around said core, and
      a pair of permanent magnets respectively fixed to both ends of said core with like poles pointing toward the core so as to increase a magnetic flux induced in said core, said permanent magnets and said core forming a single bar-shaped body.

3. A horizontal deflecting circuit for a semi-wide television, the horizontal deflection circuit comprising:
   a horizontal deflecting coil;
   a linearity coil including
      a core,
      a coil connected in series with said horizontal deflecting coil and wound around said core, and
      a pair of permanent magnets respectively fixed to both ends of said core with like poles pointing toward the core so as to increase a magnetic flux induced in said core;
   a first capacitor having a first end connected to a first node and a second end connected to a second node;
   a second capacitor having a first end connected to said second node and a second end connected to a potential;
   a first diode having an anode connected to said second node and a cathode connected to said first node;
   a second diode having an anode connected to said potential and a cathode connected to said second node;
   a third capacitor having a first end connected to said second node and a second end connected to a first end of said linearity coil opposite a second end of said linearity coil which is connected to a first end of said horizontal deflecting coil;
   a modulation coil having a first end connected to said second node, and a second end; and
   a fourth capacitor having a first end connected to the second end of said modulation coil and a second end connected to said potential;
   wherein a second end of said horizontal deflecting coil is connected to said first node.

4. A horizontal deflecting circuit as claimed in claim 3, further comprising:
   a voltage unit to generate a voltage which is stored in said third and fourth capacitors as first and second voltages, respectively;
   wherein during a first half of a scanning interval of the display device, a first current flows into said first diode, said horizontal deflecting coil, said linearity coil, and said third capacitor, and a second current flows into said second diode, said modulation coil, and said fourth capacitor, and during a second half of the scanning interval, a horizontal scanning current flows from said third capacitor into said horizontal deflecting coil through said linearity coil, and a third current flows from said fourth capacitor into said modulation coil.

5. A horizontal deflecting circuit as claimed in claim 3, further comprising
   a transistor having a collector connected to said first node and an emitter connected to said potential.

6. A horizontal deflecting circuit as claimed in claim 4, further comprising
   a transistor having a collector connected to said first node and an emitter connected to said potential.

* * * * *

UNITED STATES PATENT AND TRADEMARK OFFICE
CERTIFICATE OF CORRECTION

PATENT NO.: 5,990,636
DATED : November 23, 1999
INVENTOR(S): Ki-Ho SHIN

It is certified that error appears in the above-identified patent and that said Letters Patent is hereby corrected as shown below:

Claim 2, column 3, line 33, after "a core," delete "p2".

Signed and Sealed this

Nineteenth Day of December, 2000

Attest:

Q. TODD DICKINSON

*Attesting Officer*          *Commissioner of Patents and Trademarks*